Patented Sept. 16, 1941

2,255,940

UNITED STATES PATENT OFFICE 2,255,940

PROCESS FOR THE FORMATION OF LIGHT-POLARIZING MATERIAL

Howard G. Rogers, West Newton, Mass., assignor to Polaroid Corporation, Dover, Del., a corporation of Delaware No Drawing. Application September 18, 1939, Serial No. 295,451

14 Claims. (Cl. 18—48)

This invention relates to a new and improved process for the formation of sheets of light-polarizing material.

An object of the invention is to provide a process for improving the quality of light-polarizing sheets or films of the type described in the copending application of Land and Rogers, Serial No. 271,814, filed May 4, 1939, now Patent No. 2,173,304.

Other objects of the invention are to provide a process wherein sheets or films of the polarizing material described in said copending application are relaxed, for example by soaking in water, and restretched; to provide such a process in which the polarizing sheets are treated to improve their stability when subjected to ultraviolet radiation; and to provide a process wherein the said polarizing sheets are treated to inhibit discoloration thereof.

The invention accordingly comprises the several steps and the relation of one or more of such steps with respect to each of the others thereof which will be exemplified in the process hereinafter disclosed, and the scope of the application of which will be indicated in the claims.

In the said copending application Serial No. 271,814, there is described a light-polarizer comprising a sheet or film of an organic plastic, such for example as a vinyl resin, such as polyvinyl alcohol or polyvinyl acetal, and which has long, straight chain molecules, some of which are dichroic and some of which are negligibly dichroic, the dichroic molecules being oriented to substantial parallelism within the sheet, and being the product of an alteration within the sheet of the molecular structure of the negligibly dichroic molecules. Where polyvinyl alcohol is employed in the production of light polarizers of the type described, the sheet-like polarizer may comprise polyvinyl alcohol containing molecules of dehydrated polyvinyl alcohol or molecules of a heat alteration product of polyvinyl alcohol which are dichroic. These dichroic molecules are oriented within the sheet, for example by a stretching process in which the treated sheet may be extended to, for example, eight times its original length. Preferably the extension of the sheet is accomplished while the sheet is in a softened condition as a result of the application of heat, and the extension is to a degree which causes substantially complete orientation of the dichroic molecules within the sheet. These molecules are formed by heating the polyvinyl alcohol sheet, which may or may not have been previously treated with an acid, such for example as sulphuric acid, and which may or may not be heated in an atmosphere of super-heated steam, to a temperature at which a polarizing stain appears in the sheet. Speaking generally this temperature may be in the neighborhood of 175° C. It may, however, considerably exceed this temperature, successful results having been achieved with temperatures in the neighborhood of 205° C. It may also, and particularly where the polyvinyl alcohol sheet is subjected to an acid treatment, be considerably less than the temperature specified. In this connection satisfactory results have been achieved with temperatures in the neighborhood of 150° C.

The dichroic molecules in the polarizing sheet are hydrocarbon long straight chain molecules having extended systems of conjugated double bonds.

The said copending application points out that while light polarizers of the type described may be produced preferably from sheets of polyvinyl alcohol, other materials may be employed, and specifically other vinylic resins, such for example as polyvinyl acetal, and more generally other linear polymers built up from straight chains of carbon atoms.

This invention contemplates the further treatment of light polarizing sheets such as those disclosed in the said copending application to improve the polarizing properties thereof and the resistance to discoloration and stability to ultra violet radiation thereof.

In the practice of the present invention a stretched or otherwise extended sheet, for example a light polarizing sheet of polyvinyl alcohol containing oriented molecules of a dichroic alteration product of polyvinyl alcohol, is treated to release or relax the stretched condition of the sheet, and after being so treated the sheet is again stretched, for example to its initial stretched condition. This treatment has been found to greatly improve the polarizing properties of the sheet, and when coupled with the treatment hereinafter described, it is highly useful in preventing the discoloration of the polarizing sheet and in increasing its stability to ultraviolet radiation.

The dried, stretched polarizing sheet, which is the product of the said copending application Serial No. 271,814, may be relaxed and the stretch relieved by soaking the sheet in water. Preferably this water treatment is continued until the sheet has shrunk to approximately one-half its original stretched length. It is to be understood, however, that the soaking in water may result in a much greater shrinkage of the sheet. It may, for example, shrink to as much as one-fourth its original length, or even more. So also the water treatment may be continued only until the sheet has shrunk less than one-half its original length. In this connection it should be pointed out that the sheet will tend to return to its initial unstretched condition when soaked in water, and the degree of shrinkage may depend to some extent upon the extent to which the sheet was originally stretched in producing the product of the said copending application. In any event it is not necessary that the relaxing treatment be continued until all stretch has disappeared from the sheet. A shrinkage to one-half the stretched length of the sheet is usually found adequate.

The shrunken sheet is then re-stretched while wet, and for example until it has again assumed its initial stretched length. It is then held in this stretched condition and dried at room temperature for a short time and until the excess of water has been removed from the sheet. It will be found that the re-stretching of the sheet apparently tends to mechanically expel a great deal of the excess water, for the sheet appears to sweat when re-stretched, even after it has been wiped dry. After the initial drying the sheet may be heated to a temperature slightly below the boiling point of water, for example to a temperature approximately 90° C., and thoroughly dried at that temperature. The sheet then shows no tendency to shrink and its polarizing properties have been generally substantially improved by the treatment described.

If it is desired to inhibit discoloration in the finished stretched sheet, the water bath in which it is relaxed or shrunk may comprise a dilute solution of sodium chloride or other suitable inhibitor.

So also if the bath in which the sheet is relaxed or shrunk comprises a small amount of an acid, for example sulphuric acid, or such other acids as hydrobromic acid, hydriodic acid, or hydrochloric acid, or such organic acids as oxalic acid, lactic acid, tartaric acid, citric acid or maleic acid, the stability of the final product in ultra-violet radiation will be substantially increased.

While the process of the present invention has been described in connection with light polarizing sheets formed from polyvinyl alcohol, it is to be understood that it may be applied to products derived from linear polymers of the type heretofore described more generally.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In the process of forming a light polarizer from a transparent sheet of a plastic selected from the class consisting of polyvinyl alcohol and polyvinyl acetal, said sheet containing substantially oriented long straight-chain molecules having extended systems of conjugated double bonds, the steps comprising shrinking said sheet and stretching said shrunken sheet.

2. In the process of forming a light polarizer from a transparent sheet of polyvinyl alcohol containing substantially oriented long straight-chain molecules having extended systems of conjugated double bonds, the steps comprising shrinking said sheet by applying water thereto and stretching said shrunken sheet.

3. In the process of forming a light polarizer from a transparent sheet of a plastic selected from the class consisting of polyvinyl alcohol and polyvinyl acetal, said sheet containing substantially oriented long straight-chain molecules having extended systems of conjugated double bonds, the steps comprising shrinking said sheet and stretching said shrunken sheet to substantially its pre-shrunk dimensions.

4. In the process of forming a light polarizer from a transparent sheet of a plastic selected from the class consisting of polyvinyl alcohol and polyvinyl acetal, said sheet containing substantially oriented long straight-chain molecules having extended systems of conjugated double bonds, the steps comprising soaking said sheet in a dilute aqueous solution of an inhibitor until said sheet is shrunken and stretching said shrunken sheet.

5. In the process of forming a light polarizer from a transparent sheet of a plastic selected from the class consisting of polyvinyl alcohol and polyvinyl acetal, said sheet containing substantially oriented long straight-chain molecules having extended systems of conjugated double bonds, the steps comprising soaking said sheet in a dilute aqueous solution of an acid until said sheet is shrunken and stretching said shrunken sheet.

6. In the process of forming a light polarizer from a transparent sheet of a plastic selected from the class consisting of polyvinyl alcohol and polyvinyl acetal, said sheet containing substantially oriented long straight-chain molecules having extended systems of conjugated double bonds, the steps comprising shrinking said sheet to approximately half its initial length and stretching said shrunken sheet to approximately its pre-shrunk dimensions.

7. In the process of forming a light polarizer from a transparent sheet of polyvinyl alcohol containing substantially oriented long straight-chain molecules having extended systems of conjugated double bonds, the steps comprising shrinking said sheet by applying water thereto, stretching said shrunken sheet while it is wet, and drying said shrunken sheet while maintaining it in stretched condition.

8. In the process of forming a light polarizer from a transparent sheet of polyvinyl alcohol containing substantially oriented long straight-chain molecules having extended systems of conjugated double bonds, the steps comprising shrinking said sheet by applying water thereto, stretching said shrunken sheet while it is wet, and drying said shrunken sheet while maintaining it in stretched condition at a temperature below 100° C.

9. The process comprising forming a sheet of polyvinyl alcohol, heating said sheet to render dichroic a multiplicity of molecules thereof and to soften said sheet, stretching said sheet while soft to substantially orient the dichroic molecules thereof, hardening said stretched sheet by cooling said sheet, shrinking said stretched sheet by applying water thereto, and restretching said shrunken sheet while it is wet.

10. The process comprising forming a sheet of polyvinyl alcohol, forming a dichroic alteration product of polyvinyl alcohol in said sheet, stretching said sheet to substantially orient the molecules of said dichroic alteration product, shrinking said stretched sheet by applying thereto a dilute solution of sodium chloride, and stretching said shrunken sheet.

11. The process comprising forming a sheet of polyvinyl alcohol, forming a dichroic alteration product of polyvinyl alcohol in said sheet, stretching said sheet to substantially orient the molecules of said dichroic alteration product, shrinking said stretched sheet by applying thereto a dilute solution of an acid, and stretching said shrunken sheet.

12. The process comprising forming a sheet from a plastic material selected from the class consisting of polyvinyl alcohol and polyvinyl acetal, converting certain of the molecules of said sheet to hydrocarbon long straight-chain molecules having extended systems of conjugated double bonds, stretching said sheet to substantially orient said converted molecules, shrinking said stretched sheet, and restretching said shrunken sheet.

13. The process comprising forming a sheet from a plastic material selected from the class consisting of polyvinyl alcohol and polyvinyl acetal, converting certain of the molecules of said sheet to hydrocarbon long straight-chain molecules having extended systems of conjugated double bonds, stretching said sheet to substantially orient said converted molecules, shrinking said stretched sheet by wetting said sheet, and stretching said shrunken sheet while it is wet.

14. The process comprising forming a sheet from a plastic material selected from the class consisting of polyvinyl alcohol and polyvinyl acetal, converting certain of the molecules of said sheet to hydrocarbon long straight-chain molecules having extended systems of conjugated double bonds, stretching said sheet to substantially orient said converted molecules, shrinking said stretched sheet by wetting said sheet, stretching said shrunken sheet while it is wet, and drying said sheet while holding it in stretched condition.

HOWARD G. ROGERS.